United States Patent [19]

Schaaf et al.

[11] Patent Number: 4,644,357
[45] Date of Patent: Feb. 17, 1987

[54] RADAR CLUTTER SIMULATOR

[75] Inventors: Gregory Schaaf, Van Nuys; Garin S. Bircsak, North Hollywood, both of Calif.

[73] Assignee: The United States of America as represented by the Secretary of the Air Force, Washington, D.C.

[21] Appl. No.: 772,581

[22] Filed: Sep. 4, 1985

[51] Int. Cl.[4] ............................................. G01S 7/40
[52] U.S. Cl. ...................................... 342/168; 434/2; 342/169
[58] Field of Search ............................ 343/17.7; 434/2

[56] References Cited

U.S. PATENT DOCUMENTS

| | | | |
|---|---|---|---|
| 2,955,360 | 10/1960 | Cutler | 35/10.4 |
| 3,500,407 | 3/1970 | Thompson | 343/17.7 |
| 3,604,828 | 9/1971 | Perkovich | 343/18 E X |
| 3,732,568 | 5/1973 | O'Mary et al. | 343/17.7 |
| 3,792,475 | 2/1974 | Smetana | 343/17.7 |
| 3,832,712 | 8/1974 | Goetz | 343/17.7 |
| 3,953,850 | 4/1976 | Redman | 343/17.7 |
| 4,056,788 | 11/1977 | Brown | 331/78 |
| 4,204,342 | 5/1980 | Linfield | 434/2 |
| 4,329,688 | 5/1982 | Goldie | 343/17.7 |
| 4,560,987 | 12/1985 | Dochow et al. | 343/17.7 |

Primary Examiner—T. H. Tubbesing
Attorney, Agent, or Firm—William G. Auton; Donald J. Singer

[57] ABSTRACT

The simulation of clutter echo return signals for a radar system is accomplished using two sets of diode noise sources, a frequency synthesizer for bandwidth control, multiplexing control, two D/A converters and mixers, a 90-degree sower splitter, and a summer; the output of the summer being the simulated clutter. The two sets of noise sources each produce a digital encoded controlled bandwidth Gaussian noise signal which is strobed by the multiplexing control unit firstly to the pulse repetition interval of the radar system and secondly to the data rate of the radar system. The two strobed D/A converters convert the two digital noise signals into their analog equivalents. The two separate video channels are required to obtain the Rayleigh noise distribution characteristic of clutter. This distribution results when the analog signals from the D/A converters are multiplied with in-phase and quadrature RF reference frequencies in the two mixers, then summed in the summer.

5 Claims, 2 Drawing Figures

RADAR CLUTTER SIMULATOR

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to radar systems, and specifically to a noise generator which transforms signals from two sets of noise sources into a composite signal which simulates a clutter echo return signal.

In the manufacturing process of radar systems, it is desirable to divide the radar system up into a set of subsystems, and test each subsystem before constructing the complete radar and testing it on location. This approach gives early visibility into the performance of the radar system, and allows corrections to be made to the design before the radar is completely built.

One such subsystem test includes the testing of the radar's signal processing system using ground echo returns (or clutter) before it is attached to the radar receiver. While numerous simulators have been devised to check the performance of radar equipment, some of them require elaborate set-up procedures and are nearly as complex and expensive as the radar systems that they are used to test.

The task of reducing the size, cost and complexity of radar clutter simulators is alleviated, to some degree, by the following U.S. patents, which are incorporated herein by reference:

U.S. Pat. No. 3,732,568 issued to O'Mary et al on May 8, 1973;
U.S. Pat. No. 3,832,712 issued to Goetz et al on Aug. 27, 1974; and
U.S. Pat. No. 4,056,788 issued to Brown et al on Nov. 1, 1977.

All of the prior art cited above disclose signal simulators for testing radar systems. The disclosure of Brown et al is a digital-to-analog noise generator which includes a plurality of memories in which bandwidths, frequencies, and waveforms are stored. While the use of memories allow signal simulators to be flexible in their use, they also increase the complexity and expense of the signal simulator.

The device of O'Mary et al is a radar signal simulator which simulates radar returns to the signal processing portions of a radar system. While the O'Mary device lacks the flexibility of the apparatus of Brown et al, it has a simplicity of design which reduces its expense as well as the complexity of its use. However, while the O'Mary device outputs a simulated clutter signal with a controlled amplitude, a realistic simulation of clutter should include controlled bandwidth Gaussian noise signals with Rayleigh distribution and radar range decorrelation. The present invention is intended to produce such signals while maintaining less size, cost and complexity of alternate schemes.

SUMMARY OF THE INVENTION

The present invention provides a means of simulating a clutter return with controlled bandwidth Gaussian noise, a Rayleigh distribution, and radar range decorrelation. Radar clutter simulation is accomplished using: two sets of noise generators, a frequency synthesizer, a multiplexer control unit, two multiplexing data busses, two digital-to-analog (D/A) converters, two mixers, two amplifiers, a 90-degree power divider and a summer.

The first and second sets of noise generators both contain a plurality of diode noise source generators. Each individual noise generator outputs a digital Gaussian noise signal with controlled bandwidth which is strobed to the host radar's pulse repetition interval (PRI) by the multiplexer control unit.

The first and second multiplexing data busses respectively multiplex the outputs of the first and second sets of noise generators into first and second digital Gaussian noise signals, which are conducted to the first and second D/A converters. The first and second D/A converters respectively convert the first and second digital Gaussian noise signals, which have controlled bandwidths, into two analog video signals. The separate video channels are used in the design in order to obtain the Rayleigh noise distribution characteristics in the clutter signals.

The first and second amplifiers respectively amplify the first and second analog clutter signals from the D/A converters, and conduct them to the first and second mixers. The two mixers produce an output signal by combining a radio frequency (RF) reference signal with the first and second analog Gaussian noise signals from the two amplifiers.

The summer receives and sums the signals from the two mixers to produce an analog radio frequency (RF) Gaussian noise output with Rayleigh distribution, which is strobed to the PRI of the host radar. The strobing of the noise output, as well as control of the radar clutter, is accomplished by the frequency synthesizer and multiplexer control unit. The frequency synthesizer sends a clock and control signal to the two sets of noise generators to set the bandwidth. The multiplexer control unit receives a PRI signal from the host radar, which it uses to strobe the two sets of noise generators.

It is a primary object of the invention—and one that differentiates this clutter simulator from simpler methods of generating clutter—to simulate the physical process by which clutter is generated in a pn-encoded radar.

It is a principal object of this invention to provide a clutter generator that develops echo returns for use in testing radar systems.

It is another object of this invention to provide a clutter generator that operates in real-time to produce clutter returns to the radar system which is being evaluated.

It is another object of the invention to produce a clutter return signal with controlled bandwidth Gaussian noise, a Rayleigh distribution and radar range correlation.

These together with other objects features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention includes an apparatus which produces a simulated clutter return signal which may be connected to the signal processing portion of a radar system to test its performance.

Figure 1:
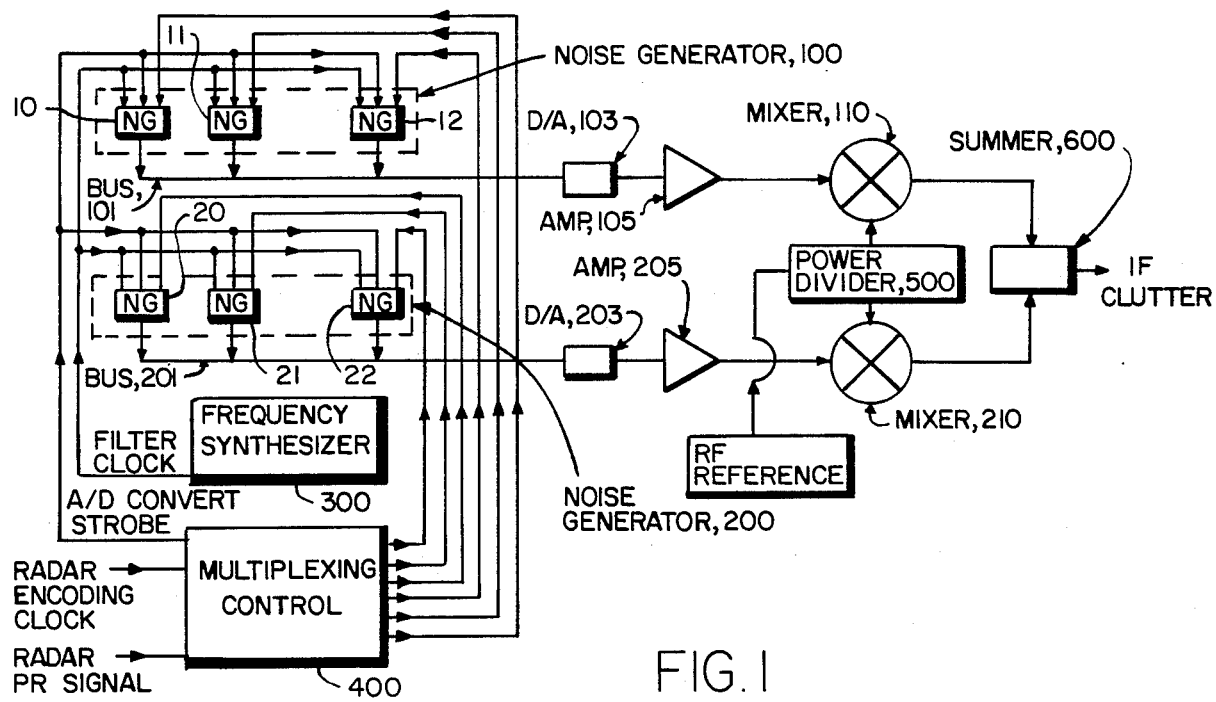
FIG. 1 is a block diagram of the preferred embodiment of the present invention.
Figure 2:
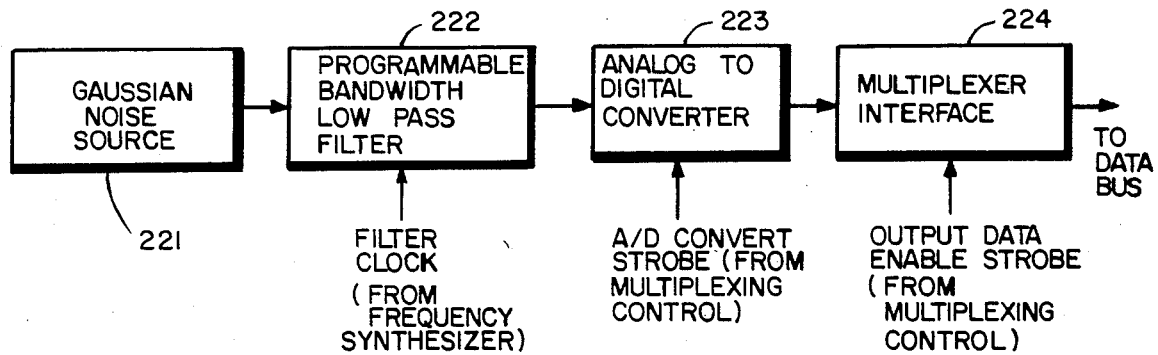
FIG. 2 is a block diagram of one of the noise generator elements of FIG. 1.

FIG. 1 is a block diagram of the preferred embodiment of the present invention. Two sets of noise generators 100 and 200 are used to generate noise signals. Each set of noise generators is composed of a plurality noise generator elements 10, 11, 12 and 20, 21, 22 which produce digital Gaussian noise signals with controlled bandwidth. FIG. 2 depicts the composition of an individual noise generator element, and is discussed in detail below.

The outputs of the first and second sets of noise generator elements 100 and 200 are multiplexed into a first and second digital multiplexed noise signal by a first and second multiplexing data bus 101 and 201 at the data rate of the encoding of the transmitted radar pulse, and conducted to two D/A converters 103 and 203. The two D/A converters 103 and 203, produce two analog video signals which correspond to the digital multiplexed noise signals of data busses 101 and 201. The two separate video channels are used in the design to obtain the Rayleigh noise distribution characteristics in the clutter signals. As will be discussed below, this distribution results when the video signals are multiplied with in-phase and quadrature RF reference frequencies, from the host radar, and then summed to produce the RF clutter signal.

The two amplifiers 105 and 205 produce output signals by amplifying the two analog video signals from the D/A converters 103 and 203. The two mixers 110 and 210 each produce an output signal by mixing an RF reference signal with one of the amplified video signals from amplifiers 105 and 205. Each mixer has three ports: a LO port, and RF port, and an IF port. The amplified video signals are received over the IF port and the RF reference signal is received, from a 90-degree power splitter 500, over the LO port. The mixing is accomplished by multiplying the amplified video signals with the in-phase and quadrature LO reference frequency signal to produce two noise signals which are summed by summer 600 to produce the RF clutter signal.

Control over the clutter simulator is accomplished using the frequency synthesizer 300 and the multiplexer control unit 400. The frequency synthesizer is a phase-locked loop integrated circuit that sends a filter clock signal to each of the sets of noise generators 100 and 200 to control the bandwidth. The bandwidth filtering process will be detailed in the discussion of FIG. 2.

The multiplexer control unit 400 is a standard transistor-transistor-logic (TTL) circuit which receives a radar pulse repetition interval signal and radar encoding clock signal from the host radar system. As will be detailed in the discussion of FIG. 2, the pulse repetition interval signal is used by the multiplexer control unit to strobe the noise generators. The multiplexer control unit 400 then directs a sampling of the output of a pair of noise generators. This preserves the spectral characteristics of clutter associated with each range interval.

FIG. 2 is a block diagram of one of the plurality of noise generator elements 10, 11, 12 and 20, 21, 22 which are used in the two sets of noise generators 100 and 200 of FIG. 1. As depicted, each noise generator element contains: a Gaussian noise source 221, a low pass filter 222, an analog-to-digital (A/D) converter 223, and a multiplexer interface 224.

Each Gaussian noise source 221 is a diode generator which produces noise that is white in the audio-frequency spectrum, and Gaussian in amplitude distribution. The noise produced by the noise source 221 is processed by the low pass filter 222, which has programmable bandwidth. The low pass filter 222 receives the filter clock signal from the frequency synthesizer 300, which sets the bandwidth for all the noise generator elements, and is used to limit the bandwidth of the Gaussian noise signal from the diode noise source. The low pass filter 222 outputs an analog voltage signal which simulates bandwidth-limited clutter.

The A/D converter 223 receives the bandwidth-limited noise signal from the low pass filter 222, and a first strobing signal from the multiplexer control unit 400. The output of the A/D converter 223 is a digital equivalent of the analog bandwidth-limited noise signal of the low pass signal, which is further strobed by the radar pulse repetition interval by the A/D converter 223.

The multiplexer interface 224 receives an enable strobe signal from the multiplexer control unit 400, and the digital noise signal from the A/D converter 223. The strobing signal received by the multiplexer control unit is different from the first strobing signal used by the A/D converter. The enable strobe signal is synchronous with the data rate of the encoding of the transmitted radar pulses of the host radar system. The multiplexer interface outputs a digital Gaussian noise signal with controlled bandwidth that has been strobed to the pulse repetition interval as well as the data rate of encoding of the host radar system. Additionally, at the beginning of each PRI the multiplexing control circuitry returns to sample the output of the first pair of audio noise generators. This preserves the spectral characteristics of the clutter associated with each range interval. The multiplexer interface, of FIG. 2, was implemented using a tri-state, differential line driver, which is a standard integrated circuit.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In combination with a radar system which has a signal processing system which operates at a pulse repetition interval and has a data rate of encoding transmitted radar pulses, said signal processing system receiving signals which represent radar echo return signals, a radar clutter simulator which produces radio signals for said signal processing system, said radio signals simulating clutter echo return signals, said radar clutter simulator comprising:

a control means which receives a first and second information signal from said signal processing system, said first information signal indicating the pulse repetition interval of the radar system, the second information signal indicating the data rate of encoding transmitted radar pulses of the radar system, said control means outputting first and second strobe signals and a clock signal, said first strobe signal indicating the pulse repetition time of the radar system, and the second strobe signal indicating the data time contained in the second information signal;

a first and second noise generating means which receives said first and second strobe signals and said clock signal from said control means, and outputs first and second digital noise signals, each of said digital noise signals being a Gaussian noise signal with controlled bandwidth which is strobed to the pulse repetition interval and data rate of the radar system by the first and second strobe signals;

a means for converting digital signals into analog signals, said converting means being electrically connected to said first and second noise generating means and converting said first and second digital noise signals respectively into first and second analog noise signals;

a mixer means which produces a first and second intermediate frequency noise signals by receiving and mixing a reference signal from said radar system with said first and second analog noise signals received from said converting means, said reference signal being an in-phase and quadrature intermediate frequency signal of said radar system; and a summing means which receives and combines said first and second intermediate frequency noise signals from said mixer means to produce said radio signals which simulate clutter echo return signals, said radio signals having the controlled bandwidth of said digital noise signals from said first and second noise generating means, said radio signals being strobed to the pulse repetition interval and data rate of the radar system.

2. A radar clutter simulator, as defined in claim 1, wherein said first and second generating means each comprises:

a plurality of diode noise generating elements each producing an individual Gaussian noise signal which is white in the audio-frequency spectrum, has controlled bandwidth, and is strobed to the pulse repetition interval and data rate of the radar system by the diode noise generating elements with the first and second strobe signals from the control means, and a multiplexer means which multiplexes the individual Gaussian noise signals from the plurality of the diode noise generating elements in the first and second noise generating means to produce said first and second digital noise signals.

3. A radar clutter simulator, as defined in claim 2, wherein each of said diode noise generating elements comprise:

a diode noise source which produces a noise signal that is white in the audio-frequency spectrum and Gaussian in amplitude distribution;

a low pass filter which has a programmable bandwidth and receives said clock signal from said control means, said low pass filter producing an analog voltage signal which siumlates bandwidth-limited clutter by filtering said noise signal from said diode noise source and limiting its bandwidth;

an analog-to-digital converter which receives said analog voltage signal from said low pass filter and said first strobe signal from said control means, said analog-to-digital converter outputting a digital noise signal by converting said analog voltage signal into digital and strobing it with said first strobe signal; and a multiplexer interface which receives said digital noise signal from said analog-to-digital converter and said second strobe signal from said control means, said multiplexer interface outputting said individual Gaussian noise signal to said multiplexer means by strobing said digital noise signal with said second strobe signal.

4. A radar clutter simulator, as defined in claim 3, wherein said mixer means comprises:

a 90-degree power splitter which produces a first and second output signal by receiving and splitting said reference signal from said radar system;

a first mixer which receives and mixes said first output signal from said 90-degree power splitter with said first analog noise signal received from said converting means to produce said first intermediate frequency noise signal; and a second mixer which receives and mixes said second output signal from said 90-degree power splitter with said second analog noise signal received from said converting means to produce said second intermediate frequency noise signal.

5. A radar clutter simulator, as defined in claim 4, wherein said control means comprises:

a frequency synthesizer which generates and sends said clock signal to each said low pass filter in said diode noise generating elements, and a multiplexer control means which receives said first and second information signals from said radar system and produces therefrom said first and second strobe signals.

* * * * *